Jan. 31, 1967   G. B. GRABILL ETAL   3,301,045
INSTRUMENT FOR MEASURING HORSEPOWER OF MARINE ENGINES
Filed April 22, 1964

INVENTORS
GLENN B. GRABILL
ELDON L. LORENZ
BY
*Price & Heneveld*
ATTORNEYS

United States Patent Office 3,301,045
Patented Jan. 31, 1967

3,301,045
INSTRUMENT FOR MEASURING HORSEPOWER OF MARINE ENGINES
Glenn B. Grabill and Eldon L. Lorenz, Grand Rapids, Mich., assignors to Michigan Wheel Company, Grand Rapids, Mich., a corporation of Michigan
Filed Apr. 22, 1964, Ser. No. 361,651
4 Claims. (Cl. 73—134)

This invention relates to a power measuring instrument for marine engines, and more particularly to a reversible power measuring device for testing the power output of installed engines under open throttle conditions in an anchored craft, yet with insignificant thrust, and water disturbance or wake resulting.

Boat manufacturers often experience a variance between the theoretical, designed power output of a marine engine, and the actual power output delivered during operation on a craft in the water. This discovery is usually accidental, however, since there has been no reliable, inexpensive, dependable, and versatile way of measuring the actual operating power output of the engine to the propeller in water for various sizes of engines. Consequently, the power efficiency is usually found out only from a lack of performance for the boat purchaser. Testing the shaft horsepower of the engine before actual operation in the water can of course be achieved with conventional torque instruments, but this does not necessarily give the true power output occurring with a propeller attached underwater. Attempts to test engine output to a submerged prop by anchoring the craft to a stationary structure such as a dock, and running the engine at high speed can presently result in serious damage to the boat and/or to the dock due to the tremendous thrust developed by the prop, coupled with the concomitant water disturbance and wake caused by the propeller.

This inability to properly test engines, both inboard and outboard, under actual operating conditions, therefore (1) causes complaints and dissatisfaction on the part of boat purchasers, (2) necessitates subsequent trial and error blade pitch adjustment of the particular propeller by the boat seller to rectify the situation, and (3) results in inaccurate design and engineering of marine propulsion systems.

Accordingly, it is an important object of this invention to provide a power measuring unit for marine engines, both inboard or outboard, enabling the engine to be water tested for power output while the craft is anchored in stationary position. The engine can be run at full throttle, yet without any significant thrust, wake or other water disturbance resulting from the testing instrument to cause damage. The novel device enables output power to be accurately measured. This allows the proper propeller to be selected and attached, and/or enables necessary adjustments and/or modifications to be made to cause the engine to meet predetermined specifications.

It is another object of this invention to provide a relatively simple, marine engine power testing unit, that not only produces insignificant thrust to the craft, but which also can be operated in either direction of rotation with equal facility, accuracy, and beneficial results. This enables engines of different types, and those with torque in opposite directions, to be tested with the same instrument. Experimentation has shown that the novel structure of one diameter can accommodate various size engines. Therefore, only a few units of different diameter and/or pitch variation are required for an entire array of different engines.

These and several other objects of this invention will become apparent upon studying the following specification in conjunction with the drawings in which.

Figure 1:
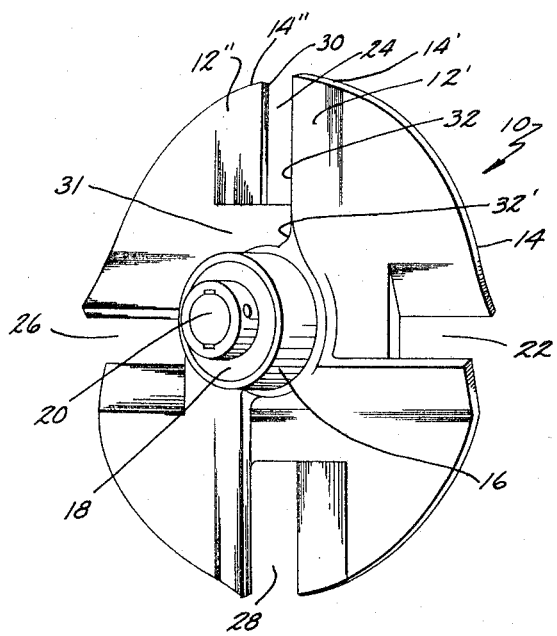
FIG. 1 is a perspective view of one form of the invention.

Referring now specifically to the drawings, the form of the invention 10 comprises a power output measuring disc, circular in configuration, and generally of uniform thickness between a first face 12 and a second face 14, both normal to the axis of the hub. In the center of the disc is the axially extending hub 16, which preferably includes a brass bushing 18 having a shaft received keyed orifice 20 to enable attachment of the unit to the output power shaft of an engine. The bushing 18 is axially replaceable to allow bushings of various sized shaft openings to be inserted into the same instrument.

Around the disc, equally spaced and arranged in an balanced pattern, is a plurality of elongated slot openings 22, 24, 26 and 28, here shown as an example to be four in number. These extend radially of the disc, with respect to the hub and disc periphery. Preferably they extend clear to the outer peripheral edge of the disc.

The side edges of each slot are circumferentially spaced, e.g. edges 30 and 32 of slot 24. The portions of the disc forming these edges are formed to project diagonally in opposite, lateral directions beyond disc faces 12 and 14, to form water drag surfaces 12' and 14'. These drag-surfaces e.g. surfaces 12' and 14' of edge 32 and surfaces 12" and 14" of edge portion 30 all extend diagonally at a small like angle of about 10° with respect to the faces of the disc.

In the first prototypes of the inventive device, the slots were formed by severing the piece out, and the portions forming the drag surfaces were severed and bent diagonally from the disc. In subsequent models of the invention, the complete disc was cast as one integral unit so that these diagonally extending or protruding portions were formed integrally, without necessitating subsequent deformation. When formed by casting, edge 32 or more specifically, radially extended portion 32' thereof, and likewise extended portion 30' of edge 30, etc. were extended to the periphery of hub 16, for maximizing water drag effect. On the other hand, the elongated slots do not extend to the hub since the solid portion 31 remaining at the base of the slot helps rigidify the structure for high speed operation.

Each of the slots and adjacent flanges are alike around the disc. The number of slots can be varied but must be in a balanced pattern. The pitch of the drag elements can vary slightly. The length of the drag flanges can also vary somewhat to suit the test involved. All of the slots and flanges are balanced, however.

In operation, the instrument unit is mounted to the output shaft of an engine beneath the water. The craft is anchored to a stationary support such as a dock. The engine is then run at full throttle or at any other particular throttle position to be tested.

As the disc is rotated at high speed, the laterally projecting flanges form water drag surfaces to absorb the energy of the engine. The water also rushes through and around the slots which form gates. It has been found with this particular construction that the resulting thrust is practically nil, and at any rate so insignificant, even with high powered engines operating at maximum speed, that the water disturbance, wake, and thrust on the craft are insignificant. The exact water flow pattern around the deflecting surfaces and slot gates is not completely known and cannot be explained in detail. However, the results indisputably show the effectiveness, efficiency, and accuracy, and the lack of any damaging effect on the craft or dock. Engines of output power from the small to large can be successfully tested in a short while, with a minimum of effort and equipment.

The usual method of testing the horsepower output is to operate the engine at full throttle or another specified throttle opening, and measure the r.p.m. of the output shaft when the novel unit is attached. Then by comparing this rotational shaft speed to a standard calibrated from a known output engine, the exact rating can be determined. The propeller to be used with this engine can be exactly selected and/or adjustments or modifications to the engine or drive system made, to cause it to meet certain predetermined specifications.

The same instrument can be employed on counter-rotating shafts with like results occurring. Therefore pairs of counter-rotating shafts on a craft can be balanced for power output with complete accuracy since both can be tested with the same instrument.

*Modified form of the invention*

Figure 3:
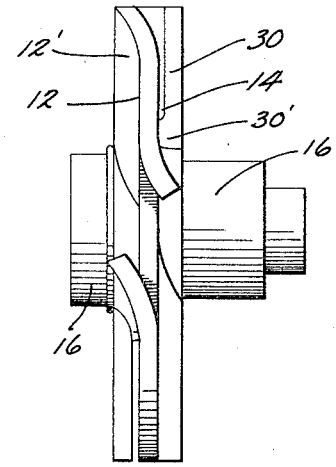
FIG. 3 is a side elevational view of the device in FIGS. 1 and 2.
Figure 4:
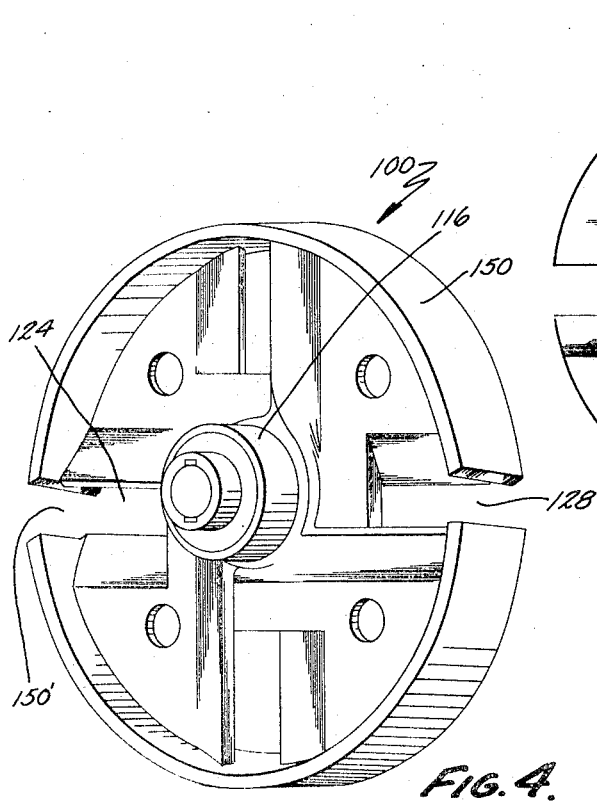
FIG. 4 is a perspective view of a slightly modified form of the invention.
Figure 2:
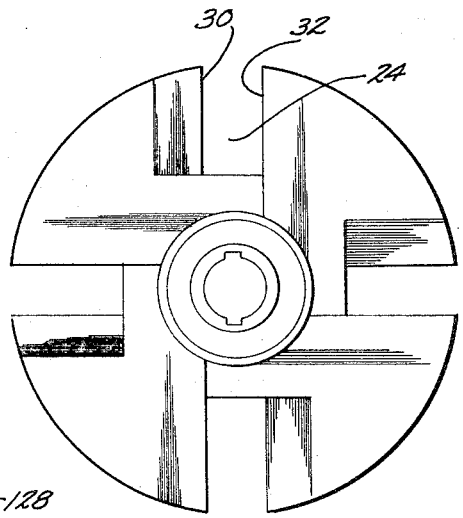
FIG. 2 is an elevational view of the device in FIG. 1.

Although the inventive structure illustrated in FIGS. 1 through 3 is preferred for most uses, the modified form 100 illustrated in FIG. 4 may be more desirable for very large engines. This form includes the same disc with its plurality of peripheral slots and laterally formed blades or flanges diagonally projecting on opposite sides of the respective slots, to form the water drag surfaces. It produces substantially negligible thrust and insignificant water disturbance. Here again the unit is mounted by using a hub 116.

In this form of the unit, the periphery of the disc has a rim 150 attached by welding or integrally cast as part of the unit. This reinforces the disc considerably, to prevent damage to it under high speed operating conditions with high powered engines. The rim in essence comprises a circular element wider than the disc, and having a thickness substantially less than its width. As illustrated in FIG. 4, when this type of unit is used for outboard engines, portions adjacent one of the slots 124 must be cut away to form gap 150', in order to enable the unit to be slid past the exhaust port protrusion of the outboard engine. In order to get balanced construction, the rim portion adjacent the opposite slot 128 must also be cut away.

The operation of this modified unit is like that described with respect to the first form of the invention.

Certain additional advantages not specifically recited herein will occur to those in the field upon studying the foregoing form of the invention. Also it is conceivable that certain minor structural modifications could be made in particular structural details to suit a particular use of the device. Therefore, this invention is not to be limited merely to the particular details illustrated and described with respect to the preferred forms of the invention, but only by the scope of the appended claims and the reasonably equivalent structures to those defined therein.

We claim:

1. A reversible, negligible-thrust, marine engine power absorbing disc for attachment to the prop shaft of marine engines and operation in water comprising: a power absorbing disc lying generally in a plane and having a central transverse shaft-receiving hub; portions of said disc defining a plurality of generally radially extending openings around said disc in symmetrical pattern, each having a substantial width in said plane to form a water flow gate; the opposite edge portions of each of said openings extending laterally at a small acute angle in opposite directions of said disc, creating water drag surfaces of substantially negligible thrust axially of said hub and the width of said gates and of said water drag surfaces being such as to create a water flow pattern of power absorbing, negligible thrust characteristics.

2. A reversible, negligible-thrust, marine power engine absorbing disc for the prop shaft of marine engines and operation in water, comprising: a power absorbing disc lying generally in a plane and having a central transverse shaft-receiving hub; a pair of opposite faces; portions of said disc defining a plurality of radially extending slots around said disc in a balanced pattern, each having a substantial width in said plane to form a water flow gate; the circumferentially displaced edge portions of said slots protruding laterally at a small acute angle with like balanced pitch in opposite directions beyond said disc faces, creating water drag and deflection surfaces to force water through said slots with a resulting substantially negligible thrust axially of said hub and the width of said gates and of said water drag surfaces being such as to create a water flow pattern of power absorbing, negligible thrust characteristics.

3. An underwater power testing instrument for marine engines enabling high speed operation of an engine, in either direction, on a stationary craft, without significant thrust or wake resulting, comprising, a circular disc lying generally in a plane and having a pair of opposite faces, and an axially extending, shaft-receiving transverse hub in the center thereof; means forming a plurality of elongated slots extending radially from the periphery of said disc toward said hub in a balanced pattern around said disc, each having a substantial width in said plane to form a water flow gate; each of said slots having a pair of circumferentially spaced side edges; said disc having portions adjacent to and forming said edges, protruding diagonally at a small acute angle in opposite directions of said disc, with like pitch, beyond said faces, placing said edges in water drag relationship when said disc is rotated and the width of said gates and of said water drag surfaces being such as to create a water flow pattern of power absorbing, negligible thrust characteristics.

4. An underwater power testing instrument for marine engines enabling high speed operation of a marine engine, in either direction, on a stationary craft, without significant thrust or wake resulting, comprising, a circular disc lying generally in a plane and having a pair of opposite faces, and an axially extending, shaft-receiving transverse hub in the center thereof; means forming a plurality of elongated slots, extending radially from the periphery of said disc toward said hub, in a balanced pattern around said disc, each having a substantial width in said plane to form a water flow gate; each of said slots having a pair of circumferentially spaced side edges, said disc having portions adjacent to and forming said edges, protruding diagonally at small acute angle in opposite directions for each slot, with like pitch, beyond said faces, placing said edges in water drag relationship when said disc is rotated; said slots terminating at a spaced relationship from said hub; extended portions of said edges extending substantially to said hub and the width of said gates and of said water drag surfaces being such as to create a water flow patterns of power absorbing, negligible thrust characteristics.

References Cited by the Examiner

UNITED STATES PATENTS

| 1,668,462 | 5/1928 | Oswald | 230—134.2 X |
| 1,684,601 | 9/1928 | Shpater | 230—134.2 X |
| 2,265,625 | 12/1941 | Buck | 170—135 |

RICHARD C. QUEISSER, *Primary Examiner.*

J. W. MYRACLE, *Assistant Examiner.*